United States Patent [19]
Lehto

[11] Patent Number: 4,861,558
[45] Date of Patent: * Aug. 29, 1989

[54] FLUE GAS SCRUBBER SYSTEM WITH CHLORIDE REMOVAL

[75] Inventor: John M. Lehto, Cokato, Minn.

[73] Assignee: Northern States Power Company, Minneapolis, Minn.

[*] Notice: The portion of the term of this patent subsequent to Aug. 9, 2005 has been disclaimed.

[21] Appl. No.: 254,095

[22] Filed: Oct. 6, 1988

Related U.S. Application Data

[63] Continuation-in-part of Ser. No. 61,217, Jun. 12, 1987, which is a continuation of Ser. No. 872,118, Jun. 9, 1986, Pat. No. 4,767,686.

[51] Int. Cl.⁴ .................... B01D 47/02; B01D 50/00; B01D 53/34
[52] U.S. Cl. .................... 422/106; 422/169; 422/170; 422/220; 422/274; 422/168; 55/255; 55/256; 55/257.1; 261/121.1
[58] Field of Search ............. 422/168, 169, 170, 220, 422/274, 106; 55/122, 126, 255, 256, 257.1, 258, 316, 339; 261/121 R; 423/242 A, 243

[56] References Cited

U.S. PATENT DOCUMENTS

| | | | |
|---|---|---|---|
| 2,787,454 | 4/1957 | Coppola | 261/122 |
| 3,647,360 | 3/1972 | Jaeger | 422/161 X |
| 3,836,630 | 9/1974 | Noguchi et al. | 423/242 A |
| 3,980,458 | 9/1976 | Berthoud | 55/255 X |
| 3,993,448 | 11/1976 | Lowery, Sr. | 55/227 X |
| 3,998,613 | 12/1976 | Attig | 55/256 |
| 4,099,925 | 1/1978 | Yanagioka et al. | 55/73 X |
| 4,132,537 | 1/1979 | Bennett | 55/226 |
| 4,156,712 | 5/1979 | Kanai et al. | 423/242 A |
| 4,229,417 | 10/1980 | Kanai et al. | 422/227 X |
| 4,239,515 | 12/1980 | Yanagioka et al. | 55/223 |
| 4,323,371 | 4/1982 | Ritvanen | 55/19 |
| 4,366,132 | 12/1982 | Hölter et al. | 423/242 |
| 4,368,060 | 1/1983 | Yanagioka et al. | 55/73 |
| 4,400,355 | 8/1983 | Donnelly et al. | 422/170 |
| 4,762,686 | 8/1988 | Lehto | 422/168 |

Primary Examiner—Barry S. Richman
Assistant Examiner—Lynn M. Kummert
Attorney, Agent, or Firm—Merchant, Gould, Smith, Edell, Welter & Schmidt

[57] ABSTRACT

A scrubber module (16) of the wet type includes a partition (26) extending across the upper end of a tank (20) between the dirty flue gas inlet (28) and the clean flue gas outlet (30). The partition (26) takes the form of a plurality of hollow fingers (32), the zig-zag lower edge of which is submerged in the aqueous absorbent (22). Oxygen-containing gas such as air is introduced into the lower end of the tank (20) as the flue gas is forced underneath the partition (26) at the upper end of the tank without pre-cleaning of the flue gas to facilitate wetting and capture of the fly ash particulate as well as oxidation and absorption of the sulfur dioxide into calcium sulfate in solution, in the same vessel. A spray dryer and separator (84) is provided for removal of chloride in dry particulate form as calcium chloride before passage of the flue gas through the aqueous absorbent in the tank (20).

8 Claims, 4 Drawing Sheets

FLUE GAS SCRUBBER SYSTEM WITH CHLORIDE REMOVAL

CROSS REFERENCE TO RELATED APPLICATION

This is a continuation-in-part of co-pending application Ser. No. 061,217 filed June 12, 1987, which is a continuation of application Ser. No. 872,118 filed June 9, 1986, now U.S. Pat. No. 4,762,686.

TECHNICAL FIELD

The present invention relates generally to a gas/liquid contacting device. More particularly, this invention concerns a modified wet scrubber module for removing fly ash particulate and sulfur dioxide, as well as chlorides, from the flue gas of a power plant before discharge into the atmosphere.

BACKGROUND

Scrubber systems have been developed for controlling harmful emissions from industrial and utility boilers like those used in power plants. Such scrubber systems typically are of either the dry or wet type. Dry scrubber systems generally include an open chamber in which the flue gas is directed through a liquid spray of lime and fly ash slurry. A chemical reaction occurs with the sulfur dioxide in the gas to form a calcium compound in dry particulate form which can then be collected at the outlet of the chamber, thereby "scrubbing" the flue gas free of sulfur dioxide pollutants.

On the other hand, in the so-called "wet scrubbers" the sulfur dioxide is not collected in dry particulate form, but instead is collected in the form of a slurry in a tank of aqueous absorbent for periodic removal in liquid slurry form. In order to avoid excessive maintenance costs from the build-up of deposits of fly ash, the fly ash must first be removed by means of filtration or electrostatic precipitation before the flue gas can be treated in a wet scrubber. This results in two large, expensive structures. Further, since the fly ash is typically removed separately, the alkalinity which otherwise would have been added by the presence of fly ash, is not present, and thus some of the fly ash which was removed must then be added to the aqueous absorbent, which of course adds further expense and complication.

U.S. Pat. No. 3,836,630 shows a system wherein sulfur dioxide absorption and oxidation is carried out in separate vessels.

U.S. Pat. Nos. 4,156,712 and 4,229,417 disclose a method and apparatus for removing sulfur dioxide from flue gases by simultaneous absorption and oxidation in an aqueous absorbent within a single vessel. As the liquid absorbent in the vessel is agitated, flue gas is sparged into the upper region as oxygen-containing gas is sparged into the lower region of the body of liquid absorbent. Alkaline material is introduced into the body of liquid absorbent to fix the sulfur dioxide in the form of a sulfate, which then precipitates out in solution for removal. These references suggest that gas/liquid contacting and solid (fly ash) precipitation can be carried out in the same device, however, since the flue gas is introduced into the upper region of the liquid absorbent via perforate or notched pipes, at least some prescrubbing of the fly ash particulate therefrom is required to avoid clogging.

While effective control of harmful emissions from industrial and utility boilers is a difficult problem at best, this problem can be even more difficult with some types of fuels. For example, refuse derived fuels (RDF) and certain types of coal have relatively high chloride contents. Chlorides are highly soluble in water, and can thus readily be removed from flue gas via a wet scrubber. However, ash and waste solids in a water slurry that contains chlorides present a complicated disposal problem. Standard waste separation techniques such as thickening and vacuum filtration are not effective for chloride and sodium-rich (caustic scrubber) waste from the systems. These highly soluble wastes do not precipitate or settle out readily. One disposal alternative is to redirect the blow down liquid back to the boiler for drying, but this causes boiler operational problems and degrades overall system performance. In addition, even if the wet wastes are directed back to the boiler for evaporation, particulate loadings on the precipitator increase for the wet caustic and wet limestone acid gas removal systems. Further, significant corrosion problems can arise because chlorides react with water to form an acid.

Another alternative is to install an on-site waste water treatment facility, but this is neither physically nor economically attractive.

A need has thus arisen for an improved hybrid flue gas scrubber system of the wet scrubber type which removes chlorides before entering the scrubber, but which does not require pre-removal of the fly ash, so that effective emissions control can be accomplished economically without the expense and complication of special waste water treatment facilities, even with fuels of high chloride content.

SUMMARY OF INVENTION

The present invention comprises an improved flue gas scrubber system which overcomes the foregoing and other difficulties associated with the prior art. In accordance with the invention, there is provided a flue gas scrubber system of the wet scrubber type which is particularly adapted for removing both fly ash particulate by wetting, and sulfur dioxide gas by absorption and oxidation, from the flue gas of a power plant in one step. The lower end of the chamber inside the scrubber module is filled with aqueous absorbent having a controlled pH between about 3.5 and 5, while the upper end is divided by a vertical partition into two subchambers. Dirty flue gas from the boiler is received in one subchamber, while scrubbed or clean flue gas leaves the other subchamber on the other side of the partition for exhaust through a stack to the atmosphere. The partition takes the form of a zig-zag or corrugated vertical side wall, the upper edges of which are closed by top walls in order to define a series of hollow "fingers". The lower edges of the side walls are continuous and are submerged in the liquid absorbent. As raw flue gas enters the scrubber chamber, it is directed into the ends of the fingers of the partition, downward around their submerged lower edges and through the liquid absorbent. Simultaneously, an oxygen-containing gas such as air is injected into the lower region of the aqueous absorbent beneath the partition, as the absorbent is agitated. The fly ash in the flue gas provides the primary reagent to react with the sulfur dioxide to form a sulfate that precipitates out of solution and can then be removed as fly ash slurry. If desired, additional calcium compound, such as limestone, can be added to the aqueous absorbent for best efficiency.

In accordance with a modification, chlorides can also be removed by dry separation before the flue gas enters the wet scrubber.

DESCRIPTION OF DRAWINGS

A better understanding of the invention can be had by reference to the following Detailed Description in conjunction with the accompanying Drawings, wherein:

FIG. 3 is a partial perspective view of the vertical partition located in the scrubber module;

DETAILED DESCRIPTION

Figure 1:
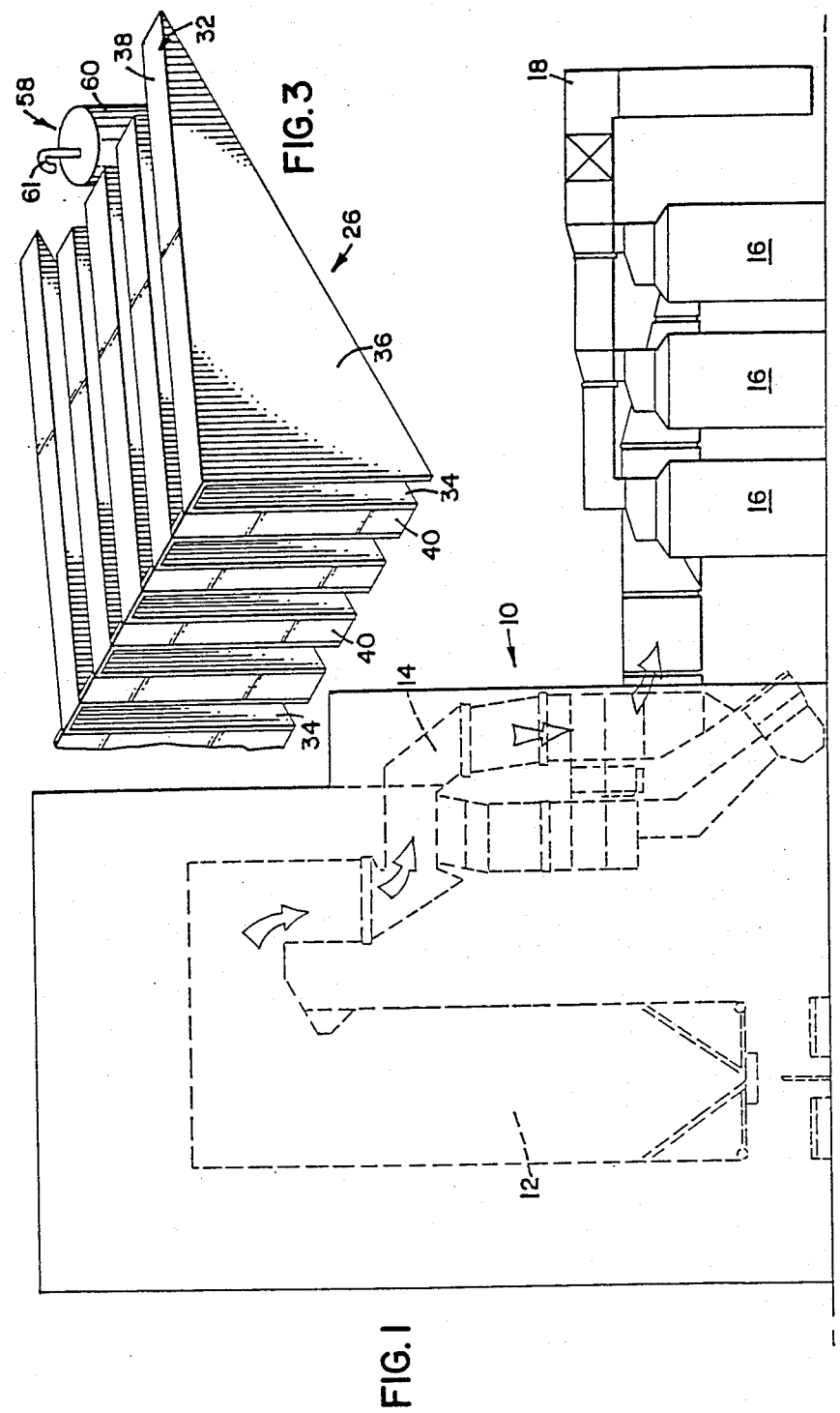
FIG. 1 is a partial schematic view of a power plant including a boiler and several scrubber modules for removing pollutants from the boiler flue gas before discharge into the atmosphere.

Referring now to the Drawings, wherein like reference numerals designate like or corresponding elements throughout the views, and particularly referring to FIG. 1, there is shown a part of a power plant 10 of the type employed by utility companies for generating electricity. The power plant 10 includes a boiler 12 which generates steam for driving a turbine that turns a generator to generate electricity. The boiler 12 is fired by coal, the particular sulfur content of which depends upon the origin of the coal. Coal of low sulfur content is preferred because of the lesser difficulty in meeting pollution control standards, although coal of relatively higher sulfur content is more typical. The flue gas from boiler 12 is directed through duct work 14 to several wet scrubber modules 16, only three of which are shown. In practice, several scrubber modules 16 are provided for reserve capacity during peak periods of power generation, and so that some of scrubber modules can be taken off line for repair and maintenance without affecting overall performance of the power plant 10. After passing through the scrubber modules 16, the scrubbed flue gas passes through duct work 18 containing induced draft fans (not shown) for exhaust through a stack to the atmosphere. As will be explained more fully hereinafter, the scrubber modules 16 are of improved construction so as to provide for simultaneous fly ash and sulfur dioxide removal with improved efficiency and reduced cost.

Figure 2:
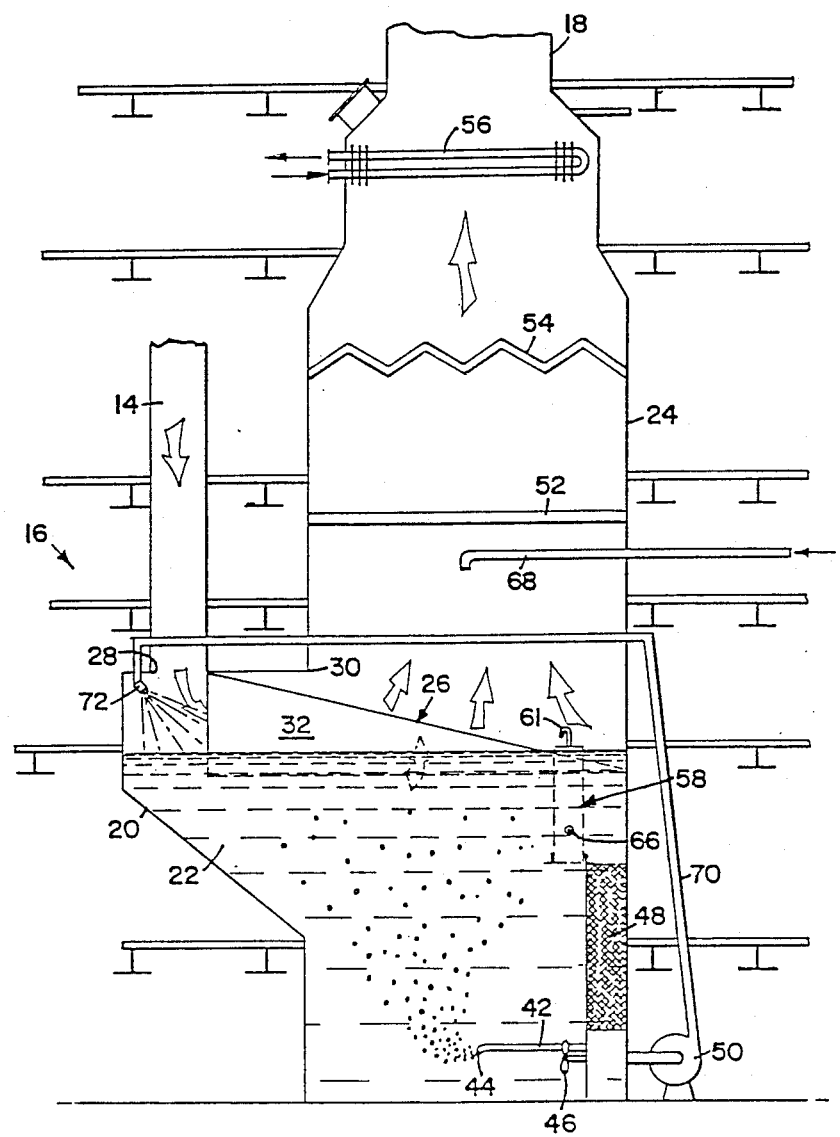
FIG. 2 is a vertical cross-sectional schematic view of one of the improved scrubber modules of the present invention.

Referring now to FIGS. 2 and 3, there is shown the internal construction of one of the scrubber modules 16. The scrubber module 16 includes a vessel or tank 20 which is partially filled with aqueous absorbent 22. The aqueous absorbent 22 basically comprises water and the fly ash particulate from the incoming flue gas, although a suitable amount of crushed limestone can be added as desired to obtain the desired pH, as will be explained more fully hereinafter. The upper end of the tank 20 is connected to the duct work 14 leading from boiler 12, as well as to a spray tower 24 and duct work 18 leading to the exhaust stack (not shown).

Referring now to FIG. 3 in conjunction with FIG. 2, a vertical partition 26 is secured across the upper end of tank 20 between the flue gas inlet 28 and the outlet 30.

The partition 26 comprises a plurality of generally parallel fingers 32 of hollow construction arranged in parallel, spaced apart relationship across the upper end of the tank 20. The fingers 32 can be rectangular, but are preferably each of generally right triangular configuration to reduce material cost. Each finger 32 is preferably constructed of stainless steel and includes a pair of side walls 34 and 36 and an inclined top wall 38. End walls 40 are connected between adjacent edges of the open divergent ends of the fingers 32 so that all of the flue gas entering inlet 28 is directed into the hollow fingers 32 of the partition 26. It will thus be appreciated that the partition 26 forms a zig-zag partition comprised of a number of vertical side walls 34 and 36 and connecting top walls 38 and end walls 40 extending across the upper end of tank 20. The zig-zag continuous lower edge of the partition 26 is submerged into the surface of the aqueous absorbent 22.

The flue gas from boiler 12 entering inlet 28 via duct work 14 is at about 300 degrees F. This dirty flue gas enters the tank 20 and is directed into the fingers 32 of the partition 26. The flue gas then passes around the zig-zag lower edge of the partition 26 and bubbles upwardly through the aqueous absorbent 22 in the upper region of tank 20 and out onto the opposite side of the partition. Simultaneously, an oxygen-containing gas, such as air, is introduced into the lower region of the aqueous absorbent 22 through a pipe 42. The pipe 42 preferably includes a downwardly-turned end 44 to prevent backflow of aqueous absorbent 22 therein. An agitator 46 is also provided in the tank 20 for circulation. The oxygen containing gas from pipe 42 bubbles upwardly through the aqueous absorbent 22 in tank 20 until it joins with the flue gas bubbling underneath the partition 26, whereupon the fly ash and sulfur dioxide in the flue gas reacts with the calcium and oxygen in the aqueous absorbent 22 to form calcium sulfate, which then precipitates out of solution and collects within the tank 20 in accordance with wellknown chemical reactions. The agitator 46 helps to keep the calcium sulfate suspended in solution in the aqueous absorbent 22, which in effect becomes a slurry. The slurry can be selectively withdrawn through an outlet 48 via pump 50.

The scrubbed or clean flue gas enters outlet 30 at about 130 degrees F., passing upwardly in tower 24 first through a conventional bulk entrainment separator 52 and then through a conventional mist eliminator 54 to remove excess moisture.

In the preferred embodiment, the scrubber module 16 includes a reheater coil 56 in the upper end of tower 24 after the mist eliminator 54 for heating the scrubbed flue gas to a temperature of about 160 degrees F. in order to increase gas buoyancy and reduce condensation and thus corrosion in the duct work 18. The reheater coil 56 can be connected to the de-aerator (not shown) or any other suitable source of heat.

Figure 4:
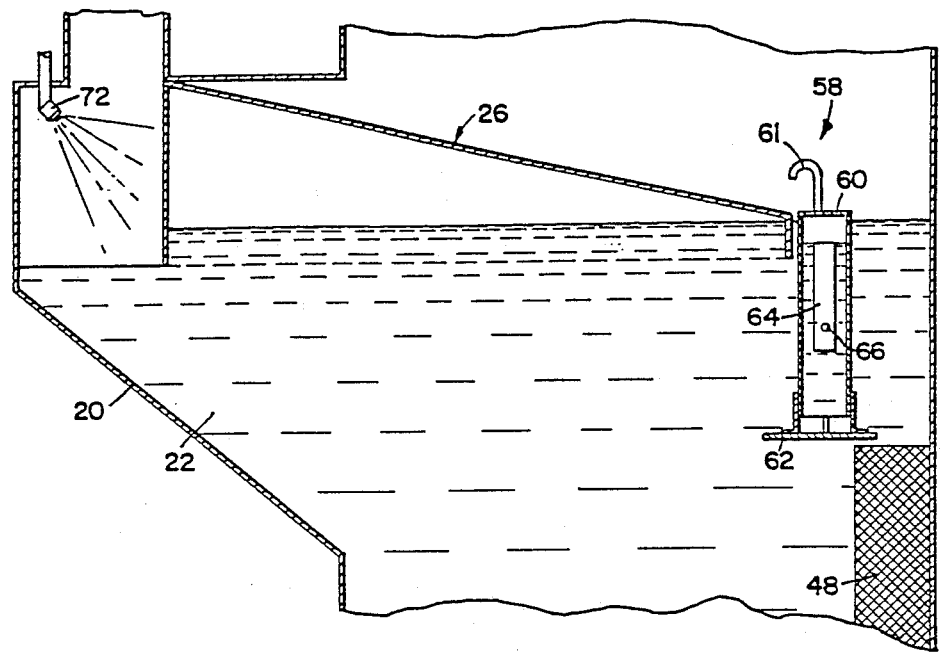
FIG. 4 is an enlarged partial vertical sectional view of the scrubber module.

Referring again to FIG. 2 in conjunction with FIG. 4, the scrubber module 16 of the invention preferably includes a level control 58 for maintaining proper level of aqueous absorbent 22 in the tank 20. The level control 58 comprises an outer tube 60 having a closed upper end and an open bottom end. A plate 62 is suspended in spaced apart relationship from the open bottom end of the outer tube 60 to prevent bubbles from pipe 42 from entering. An inner tube 64 is positioned inside the outer tube 60. The inner tube 64 includes an open top end and a closed bottom end. In this manner excess aqueous absorbent 22 fills the outer tube 60 and spills over into the inner tube 64 for withdrawal by means of overflow pipe 66 which is connected to the inner tube and extends out through the tank 20.

Additional make-up water can be added to tank 20 through pipe 68.

It will be noted that the water level on opposite sides of partition 26 is different. The pressure drop across partition 26 is about 10–15 inches of water, depending upon the scrubbing efficiency desired.

Referring again to FIG. 2, the scrubber module 16 preferably includes a line 70 leading from pump 50 to nozzles 72, only one of which is shown, positioned to discharge slurry from tank 20 onto the inside of fingers 32. Nozzles 72 can be actuated periodically for purposes of cleaning partition 26 and quenching the incoming flue gas to a temperature of about 140–150 degrees F. for more effective operation.

As indicated above, the pH of the aqueous absorbent 22 ranges between about 3 and 6, and preferably between 3.5 and 5.0. It will be understood that the aqueous absorbent contains both the fly ash and the sulfur dioxide removed from the flue gas, and their chemical combinations with water, oxygen, fly ash constituents, and any additional alkaline material added as necessary to control pH. For example, a slurry of crushed limestone can be added to the aqueous absorbent for pH control. It has been found experimentally that 70% sulfur dioxide removal could be achieved from flue gas containing 600 ppm fly ash particulate with aqueous absorbent of 3.5 pH, without any alkaline additives using only the available calcium in the fly ash for sulfur fixation as calcium sulfate. Alkaline material is added to the aqueous absorbent to control pH as necessary in accordance with the calcium content of the fly ash, the sulfur dioxide content of the flue gas, and the required percentage removal of sulfur dioxide from the flue gas.

Figure 5:
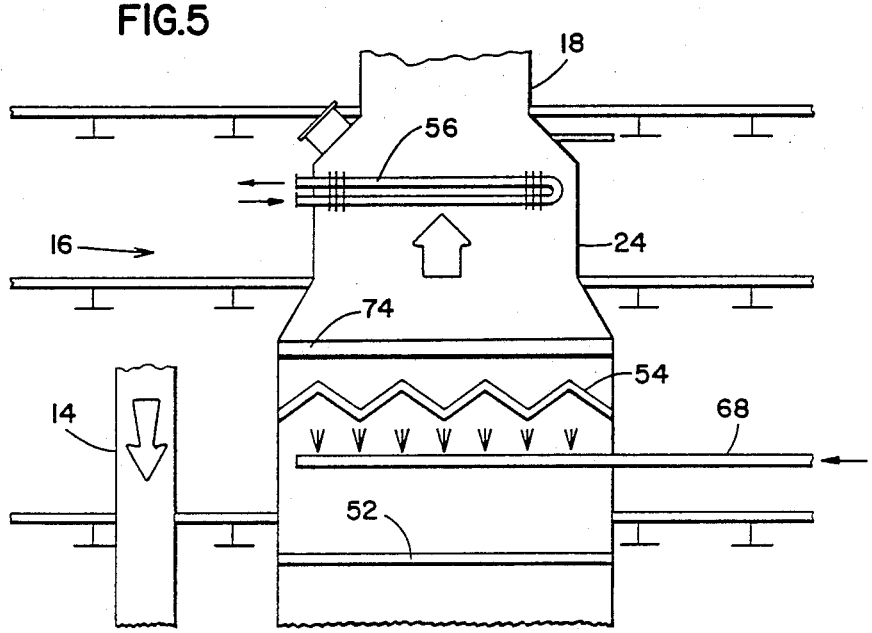
FIG. 5 is a partial view of a modification to the scrubber module of FIG. 4.

FIG. 5 shows a modification to the spray tower 24 of the scrubber module 16. An electrostatic precipitator 74 is provided between mist eliminator 54 and the reheater coil 56. The electrostatic precipitator 74 is of conventional construction and can be obtained from various manufacturers, such as the Western Precipitator Division of Joy Technologies, Inc., for example. In addition the water pipe 68 has been positioned above the bulk entrainment separator 52 and nozzles have been provided thereon in order to wash the mist eliminator 54.

Figure 6:
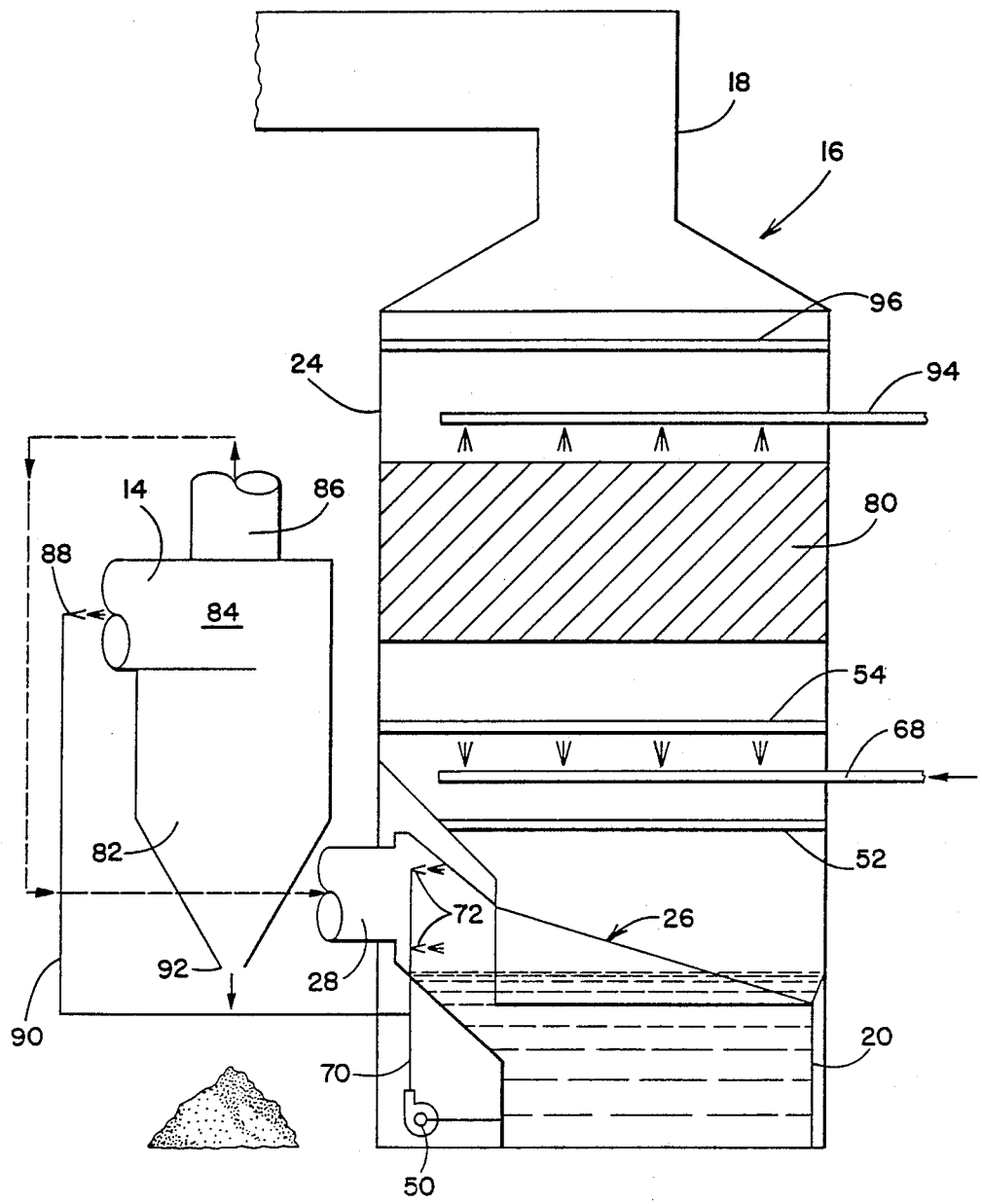
FIG. 6 is a vertical cross-sectional schematic view of a scrubber module modified for chloride removal.

Referring now to FIG. 6, there is shown a modification to the scrubber module 16 in order to provide for chloride removal, in addition to simultaneous fly ash particulate and sulphur dioxide removal, from the flue gas. This modified scrubber module is particularly adapted for use in systems which burn fuels with high chloride content, such as refuse derived fuels (RDF) or certain types of coals. In addition to mist eliminator 54, the modified scrubber module 16 preferably includes an electrostatic precipitator 80 similar to precipitator 74 within the spray tower 24, for final removal of fine particulate and droplets from the flue gas before discharge to atmosphere.

More importantly, however, there is provided a cyclone separator 82 upstream of tank 20. The duct work 14 from boiler 12 is connected to the tangential gas inlet 84 of the cyclone separator 82. The axial gas outlet 86 of the separator 82 is connected to the inlet 28 of the scrubber module 16, as indicated by dashed lines in FIG. 6. At least one nozzle 88 is located in the inlet 84 of the cyclone separator 82. The nozzle 88 is connected by line 90 to line 70 so that the calcium sulfate slurry from the tank 20 can be sprayed through the incoming flue gas, thereby dissolving most of the chlorides from the flue gas to form a calcium chloride compound which dries in the separator 82 for removal via a bottom outlet 92 and further disposal in accordance with conventional practice. The cyclone separator 82 and nozzle 88 thus function as a crude spray dryer. Inexpensive limestone from the tank 20 acts as the reagent. Consequently, chlorides are removed from the flue gas before entering the scrubber module 16, thereby avoiding corrosion problems and difficulties in separating the chlorides after entry in solution.

If desired, another water pipe 94 with downwardly directed nozzles can be added for washing the electrostatic precipitator 80, followed by another mist eliminator 96.

From the foregoing, it will thus be apparent that the present invention comprises an improved flue gas scrubber system having several advantages over the prior art. One important advantage involves the fact that both fly ash removal and sulfur dioxide removal take place simultaneously in a single vessel, whereas in the past it was necessary to remove the fly ash before removing the sulfur dioxide. The present invention avoids the additional equipment, cost, and maintenance heretofore associated with preliminary fly ash removal. Also, the system herein can be modified to remove chlorides in a simple yet effective manner. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications, and/or rearrangement of elements falling within the scope of the invention as defined by the following claims.

What is claimed is:

1. A scrubber system for removal of fly ash, sulfur dioxide and chlorides from flue gas, comprising:

a tank having upper and lower ends, said tank including a gas inlet and a gas outlet located in mutually spaced-apart relationship in the upper end thereof;

aqueous absorbent filling the lower end of said tank;

a cyclone separator having a flue gas inlet, a flue gas outlet connected in fluid communication with the gas inlet of said tank, and a material outlet;

means for spraying aqueous absorbent across the flue gas inlet of said cyclone separator in order to effect removal of chlorides therefrom in dry particulate form;

partition means for dividing the upper end of said tank into two subchambers in respective fluid communication with the gas inlet and the gas outlet, said partition means including a plurality of horizontal fingers each bounded in part by interconnected spaced-apart side walls with end walls connected between adjacent fingers in order to define a zig zag lower edge submerged in the aqueous absorbent, one side of said partition means opening into the subchamber communicating with the gas inlet for directing the flue gas through the aqueous absorbent, and the other side of said partition means opening into the subchamber communicating with the gas outlet; and means extending into said tank beneath said partition means for introducing an oxygen-containing gas into the aqueous absorbent in order to effect removal of fly ash and sulfur dioxide therefrom in liquid slurry form.

2. The scrubber module of claim 1, wherein:
each finger includes interconnected side walls and an inclined top wall defining an open divergent end and an opposite closed convergent end; and
an end wall interconnecting adjacent side walls at the divergent open ends of adjacent fingers.

3. The scrubber module of claim 1, further including:
means for maintaining the aqueous absorbent at a predetermined level in said tank relative to said partition means.

4. The scrubber of claim 1, further including:
means for withdrawing aqueous absorbent from said tank and spraying the aqueous absorbent onto said partition means for cleaning.

5. The scrubber module of claim 1, further including:
a spray tower connected to the gas outlet of said tank;
at least one mist eliminator located in said spray tower;
ductwork connecting said spray tower to an exhaust stack; and
an electrostatic precipitator located in said spray tower between said mist eliminator and said ductwork.

6. The scrubber of claim 1, further including:
means for adding make-up water to said tank.

7. The scrubber module of claim 1, further including:
means for agitating the aqueous absorbent in said tank.

8. A scrubber system for removing fly ash, sulfur dioxide and chlorides from flue gas, comprising:
a tank having upper and lower ends, said tank including a gas inlet and a gas outlet located in mutually spaced-apart relationship in the upper end thereof;
aqueous absorbent filling the lower end of said tank;
means connected to said gas inlet for dissolving, drying and separating chlorides from the flue gas;
partition means for dividing the upper end of said tank into two subchambers in respective fluid communication with the gas inlet and the gas outlet, said partition means including a plurality of horizontal fingers each bounded in part by interconnected spaced-apart side walls with end walls connected between adjacent fingers in order to define a zig zag continuous lower edge submerged in the aqueous absorbent, one side of said partition means opening into the subchamber communicating with the gas inlet for directing the flue gas through the aqueous absorbent, and the other side of said partition means opening into the subchamber communicating with the gas outlet;
means extending into said tank beneath said partition means for introducing an oxygen-containing gas into the aqueous absorbent in order to effect removal of fly ash and sulfur dioxide;
a spray tower connected to the gas outlet of said tank;
a mist eliminator located in said spray tower; and
an electrostatic precipitator located in said spray tower.

* * * * *